US012627000B2

(12) United States Patent (10) Patent No.: US 12,627,000 B2
Matsunobu et al. (45) Date of Patent: May 12, 2026

(54) MANUFACTURING METHOD OF POROUS MEDIUM OF OLEFIN-BASED RESIN, MANUFACTURING METHOD OF SEPARATOR FOR BATTERY, AND MANUFACTURING APPARATUS

(71) Applicants: TOYOTA JIDOSHA KABUSHIKI KAISHA, Toyota (JP); FUKUOKA INSTITUTE OF TECHNOLOGY, Fukuoka (JP)

(72) Inventors: Kohei Matsunobu, Toyota (JP); Kiyoshi Matsuyama, Fukuoka (JP)

(73) Assignees: TOYOTA JIDOSHA KABUSHIKI KAISHA, Toyota (JP); FUKUOKA INSTITUTE OF TECHNOLOGY, Fukuoka (JP)

( * ) Notice: Subject to any disclaimer, the term of this patent is extended or adjusted under 35 U.S.C. 154(b) by 808 days.

(21) Appl. No.: 17/974,050

(22) Filed: Oct. 26, 2022

(65) Prior Publication Data

US 2023/0178849 A1 Jun. 8, 2023

(30) Foreign Application Priority Data

Dec. 3, 2021 (JP) ................................. 2021-197100

(51) Int. Cl.
*H01M 50/417* (2021.01)
*C08J 9/28* (2006.01)
*H01M 50/403* (2021.01)

(52) U.S. Cl.
CPC .......... *H01M 50/417* (2021.01); *C08J 9/283* (2013.01); *H01M 50/403* (2021.01); (Continued)

(58) Field of Classification Search
CPC ............. H01M 50/417; H01M 50/403; H01M 8/0239; C08J 9/283; C08J 2201/0502; (Continued)

(56) References Cited

U.S. PATENT DOCUMENTS

2003/0064156 A1* 4/2003 Shih ........................ A61L 27/58
427/337
2014/0127494 A1* 5/2014 Yakuwa ..................... C08J 5/18
427/373
(Continued)

FOREIGN PATENT DOCUMENTS

CN 114805903 A 7/2022
CN 114835939 A 8/2022
(Continued)

*Primary Examiner* — K. Boyle
(74) *Attorney, Agent, or Firm* — Oliff PLC

(57) ABSTRACT

A polymer solution is created by mixing an olefin-based resin and a solvent in a pressure vessel. A high-pressure fluid of carbon dioxide is created. Temperature of the high-pressure fluid is adjusted. A mixed fluid is created by mixing the high-pressure fluid of which the temperature is adjusted and the polymer solution in the pressure vessel. Cooling of the mixed fluid causes phase separation of the mixed fluid to occur. After phase separation, pressure in the pressure vessel is released, and the solvent and the carbon dioxide vaporize. The vaporizing of the solvent and the carbon dioxide creates a porous medium of olefin-based resin.

11 Claims, 9 Drawing Sheets

(52) U.S. Cl.
CPC .... *C08J 2201/0502* (2013.01); *C08J 2203/08* (2013.01); *C08J 2205/048* (2013.01); *C08J 2323/06* (2013.01); *C08J 2323/12* (2013.01)

(58) Field of Classification Search
CPC ............. C08J 2203/08; C08J 2205/048; C08J 2323/06; C08J 2323/12; C08J 9/127; C08J 9/141; C08J 2203/14; C08J 2203/182; C08J 9/122; C08J 5/18; C08J 2203/06; C08J 2323/00; C08J 9/28; Y02E 60/10
See application file for complete search history.

(56) References Cited

U.S. PATENT DOCUMENTS

| | | | |
|---|---|---|---|
| 2021/0061969 A1 | 3/2021 | Matsunobu et al. | |
| 2021/0061970 A1* | 3/2021 | Matsunobu | ............... C08J 9/28 |
| 2022/0243024 A1 | 8/2022 | Matsunobu et al. | |
| 2022/0243025 A1 | 8/2022 | Matsunobu et al. | |

FOREIGN PATENT DOCUMENTS

| | | |
|---|---|---|
| EP | 4036162 A1 | 8/2022 |
| JP | 2016-176061 A | 10/2016 |
| JP | 2021-030666 A | 3/2021 |
| JP | 2021-031649 A | 3/2021 |
| JP | 2022-116681 A | 8/2022 |
| JP | 2022-117582 A | 8/2022 |
| KR | 10-2022-0110126 A | 8/2022 |

\* cited by examiner

MANUFACTURING METHOD OF POROUS MEDIUM OF OLEFIN-BASED RESIN, MANUFACTURING METHOD OF SEPARATOR FOR BATTERY, AND MANUFACTURING APPARATUS

CROSS-REFERENCE TO RELATED APPLICATION

This application claims priority to Japanese Patent Application No. 2021-197100 filed on Dec. 3, 2021, incorporated herein by reference in its entirety.

BACKGROUND

1. Technical Field

The present disclosure relates to a manufacturing method of a porous medium of an olefin-based resin, a manufacturing method of a separator for a battery, and a manufacturing apparatus.

2. Description of Related Art

Japanese Unexamined Patent Application Publication No. 2016-176061 (JP 2016-176061 A) discloses a porous sintered compact of polyethylene.

SUMMARY

Various types of porous media of olefin-based resin (hereinafter, may be abbreviated to "porous media") are being manufactured. There is demand for controlling pore structures in accordance with the use of the porous medium.

The present disclosure discloses a manufacturing method of a porous medium of olefin-based resin, regarding which the pore structure can be controlled.

Technical configurations, and functions and effects of the present disclosure will be described below. Note however, that an acting mechanism according to the present specification includes estimation. The acting mechanism does not limit the technical scope of the present disclosure.

1. A manufacturing method of a porous medium of an olefin-based resin includes the following steps of (a) to (f): (a) preparing a polymer solution by mixing the olefin-based resin and a solvent in a pressure vessel; (b) creating a high-pressure fluid of carbon dioxide; (c) adjusting a temperature of the high-pressure fluid; (d) preparing a mixed fluid by mixing the high-pressure fluid of which the temperature is adjusted, and the polymer solution, in the pressure vessel; (e) cooling the mixed fluid to cause phase separation of the mixed fluid; and (f) vaporizing the solvent and the carbon dioxide following the phase separation, by releasing pressure in the pressure vessel. The vaporizing of the solvent and the carbon dioxide in the step (f) produces the porous medium of the olefin-based resin.

A polymer solution can be formed by mixing the olefin-based resin and the solvent. A high-pressure fluid of carbon dioxide ($CO_2$) is mixed with the polymer solution. This forms a mixed fluid. $CO_2$ is a poor solvent in the mixed fluid. Cooling of the mixed fluid causes phase separation of the mixed fluid to occur. Vaporization of the $CO_2$ and the solvent following phase separation produces a porous medium. The pore structure can change depending on the mode of phase separation.

According to new findings of the present disclosure, the mode of phase separation can be controlled by the temperature of the high-pressure fluid ($CO_2$). This is thought to be due to affinity between the high-pressure fluid ($CO_2$) and the polymer solution changing depending on the temperature of the high-pressure fluid ($CO_2$).

2. The porous medium of the olefin-based resin may contain at least one type selected from a group consisting of a first pore structure, a second pore structure, and a third pore structure. The first pore structure is formed by particles being linked. The second pore structure is a three-dimensional network. In the second pore structure, multiple foamy pores communicate with each other. The third pore structure is a three-dimensional network. In the third pore structure, the multiple foamy pores are independent from each other.

In the manufacturing method of "1" above, for example, the first to third pore structures can be separately produced at will. For example, the second pore structure is useful as a separator for a battery. Note that a porous medium having both the first pore structure and the second pore structure, for example, may be formed. Also, a porous medium having both the second pore structure and the third pore structure, for example, may be formed.

3. The above step (c) may include adjusting the temperature of the high-pressure fluid such that the phase separation results in spinodal decomposition.

The mode of phase separation can be controlled to spinodal decomposition by the temperature of the high-pressure fluid. The second pore structure is thought to be able to be formed by spinodal decomposition.

4. The above step (c) may include adjusting the temperature of the high-pressure fluid such that a spinodal region is created in a liquid phase in a phase diagram of the polymer solution and the high-pressure fluid.

The phase diagram of the polymer solution and the high-pressure fluid can change depending on the temperature of the high-pressure fluid. The affinity between the polymer solution and the high-pressure fluid is thought to change depending on the temperature of the high-pressure fluid.

5. In the spinodal region, a mixture ratio of the polymer solution and the high-pressure fluid may be adjusted.

The mode of phase separation can also change depending on the mixture ratio of the polymer solution and the high-pressure fluid.

6. The above step (c) may include adjusting the temperature of the high-pressure fluid such that a difference between a first solubility parameter of the olefin-based resin and a second solubility parameter of the high-pressure fluid is 5.3 or more.

When the difference between the first solubility parameter of the olefin-based resin and the second solubility parameter of the high-pressure fluid is 5.3 or more, the second pore structure and the third pore structure tend to be readily formed.

7. The olefin-based resin may contain polyethylene. In the above step (c), the temperature of the high-pressure fluid may be adjusted to 50° C. to 100° C.

When the olefin-based resin contains polyethylene (PE), the second pore structure and the third pore structure tend to be readily formed by adjusting the temperature of the high-pressure fluid to 50° C. to 100° C.

8. The olefin-based resin may contain polypropylene. In the above step (c), the temperature of the high-pressure fluid may be adjusted to 120° C. to 150° C.

When the olefin-based resin contains polypropylene (PP), the second pore structure and the third pore structure tend to be readily formed by adjusting the temperature of the high-pressure fluid to 120° C. to 150° C.

9. The high-pressure fluid may be a supercritical fluid.

10. In the above step (f), the pressure vessel may be heated to 40° C. to 60° C. before the pressure is released.

11. A manufacturing method of a separator for a battery includes the following (A) and (B): (A) manufacturing a porous medium of an olefin-based resin by the manufacturing method; and (B) manufacturing a separator for a battery, the separator including the porous medium of the olefin-based resin.

The porous medium of the olefin-based resin may be used, for example, as a separator for a battery.

12. A manufacturing apparatus includes a pressure vessel configured to seal an olefin-based resin and a solvent, a compression device configured to create a high-pressure fluid by compressing carbon dioxide, and a temperature adjustment device configured to adjust a temperature of the high-pressure fluid. The manufacturing apparatus is configured to prepare a polymer solution by mixing the olefin-based resin and the solvent in the pressure vessel, mix the high-pressure fluid after temperature adjustment and the polymer solution in the pressure vessel, cool a mixed fluid in which the high-pressure fluid and the polymer solution are mixed, and release pressure in the pressure vessel following phase separation that is caused by cooling the mixed fluid.

The manufacturing method of the porous medium of the olefin-based resin according to the above "1" may be carried out by the manufacturing apparatus according to the above "12".

An embodiment of the present disclosure (hereinafter, may be abbreviated to "present embodiment") and an example of the present disclosure (hereinafter, may be abbreviated as "present example") will be described below. Note however, that the present embodiment and the present example do not limit the technical scope of the present disclosure.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Figure 1:
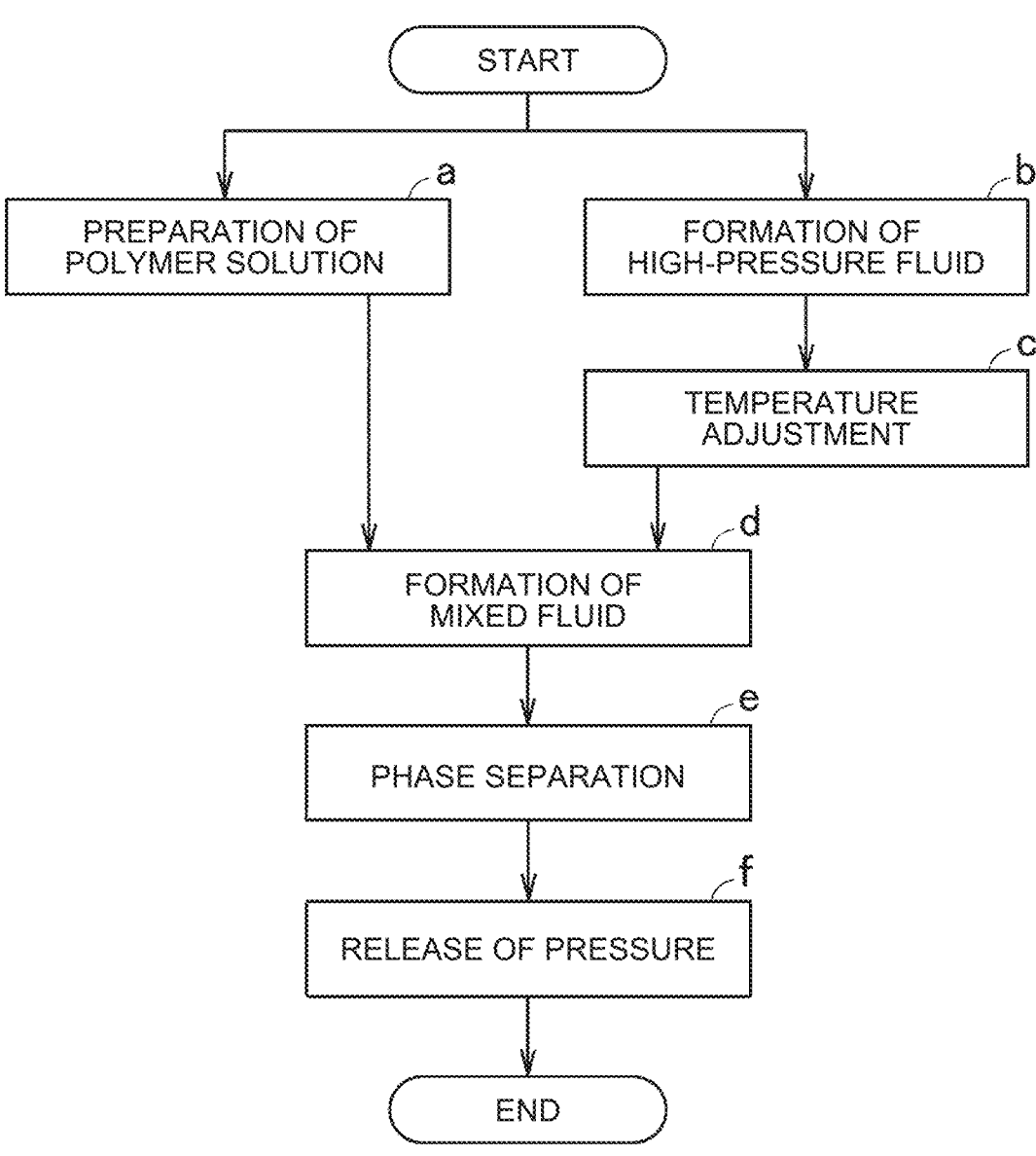
FIG. 1 is a schematic flowchart of a manufacturing method of a porous medium of an olefin-based resin according to an embodiment.

Definition of Terms, Etc.

In the present specification, the terms "comprise", "include", "have", and variations thereof (e.g., "composed of" or the like) are open-ended. Additional elements may or may not be included in addition to essential elements in open-ended terms. The term "consisting of" is closed-ended. However, even closed-ended terms do not exclude normally-associated impurities and additional elements that are irrelevant to the technology according to the present disclosure. The term "substantially consisting of" is semi-closed-ended. Semi-closed-ended terms allow addition of elements that do not substantially affect the basic and novel characteristics of the technology according to the present disclosure.

In the present specification, the words such as "may" and "can" are used in a permissive sense, meaning that "it is possible," rather than in a mandatory sense, meaning "must".

In the present specification, the order in which a plurality of steps, actions, operations, etc. included in various methods is performed is not limited to the described order unless otherwise specified. For example, the steps may be ongoing at the same time. Also, for example, the order of the steps may be inverted.

In the present specification, numerical value ranges such as "m % to n %", for example, include upper limit values and lower limit values thereof unless otherwise specified. That is to say, "m % to n %" indicates the numerical value range of "m % or more and n % or less". Further, "m % or more and n % or less" includes "more than m % and less than n %". Further, a numerical value optionally selected from within a numerical value range may be set as a new upper limit value or a new lower limit value. For example, a new numerical value range may be set by optionally combining a numerical value in the numerical value range and a numerical value described in a different part of the present specification, a table, the drawings, or the like.

In the present specification, all numerical values should be interpreted as being preceded by the term "about". The term "about" can mean, for example, ±5%, ±3%, ±1%, or the like. All numerical values can be approximate values that can vary depending on the manner in which the technology according to the present disclosure is used. All numerical values can be expressed in significant figures. A measured value can be an average value of a plurality of measurements. The number of measurements may be three or more, five or more, or ten or more. Generally, the larger the number of measurements is, the higher the reliability of the average value is anticipated to be. Measured values can be rounded off, based on the number digits of significant figures. Measured values can include error and so forth, due to detection limits and so forth of measuring devices, for example.

The term "pressure vessel" in the present specification refers to a closed vessel that receives pressure from at least one of inside and outside of the vessel. The pressure vessel may be configured to withstand a pressure of, for example, 0.2 MPa to 50 MPa.

The term "melting point" in the present specification indicates a peaktop temperature of a melting peak (endothermic peak) in a differential scanning calorimetry (DSC) curve. The DSC curve can be measured conforming to "JIS K 7121".

The term "high-pressure fluid" in the present specification refers to a fluid above critical pressure. High-pressure fluids include supercritical fluids. The term "supercritical fluid" refers to a fluid at critical pressure or higher, and at critical temperature or higher.

The term "olefin-based resin" in the present specification refers to a polymer material synthesized from a monomer containing an alkene. The olefin-based resin may be a homopolymer or may be a copolymer. The olefin-based resin may contain at least one type selected from a group consisting of low-density polyethylene (LDPE), high-density polyethylene (HDPE), ultra-high-molecular-weight polyethylene (UHMW), polypropylene (PP), polymethylpentene (PMP), and ethylene-vinyl acetate copolymer (EVA), for example.

Manufacturing Method of Porous Medium of Olefin-Based Resin

FIG. 1 is a schematic flowchart of a manufacturing method of a porous medium of olefin-based resin according to the present embodiment. Hereinafter, "manufacturing method of a porous medium of olefin-based resin according to the present embodiment" may be abbreviated to "the present manufacturing method". The present manufacturing method includes "(a) preparation of polymer solution", "(b) formation of high-pressure fluid", "(c) temperature adjustment", "(d) formation of mixed fluid", "(e) phase separation", and "(f) release of pressure".

Manufacturing Apparatus

Figure 2:
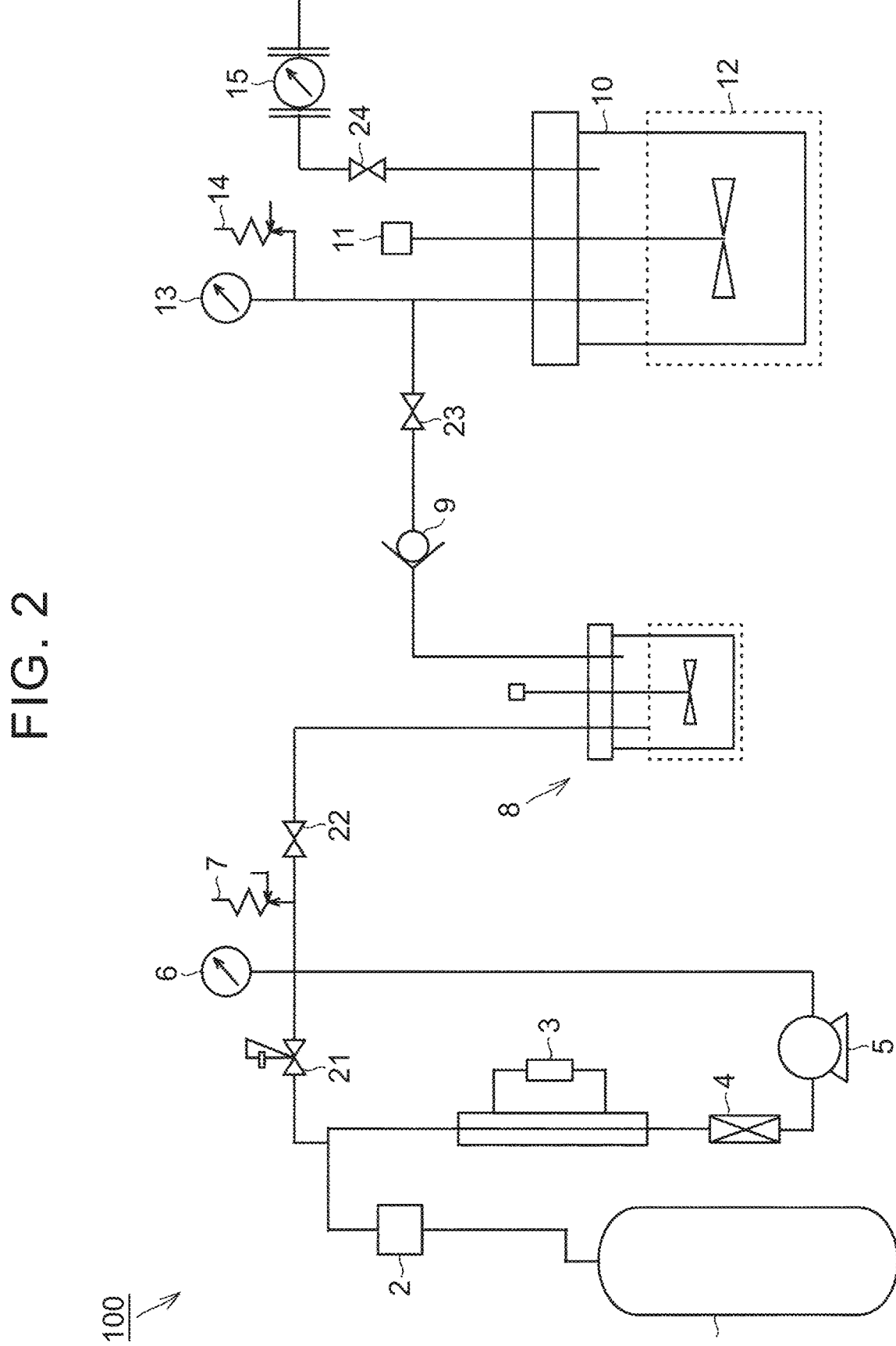
FIG. 2 is a conceptual diagram illustrating an example of a manufacturing apparatus according to the embodiment.

FIG. 2 is a conceptual diagram illustrating an example of a manufacturing apparatus according to the present embodiment. Hereinafter, "manufacturing apparatus according to the present embodiment" may be abbreviated to "present manufacturing apparatus". The present manufacturing apparatus 100 may include, for example, a gas cylinder 1, a drying tube 2, a cooling device 3, a filter 4, a compression device 5, a first pressure gauge 6, a first safety valve 7, a temperature adjustment device 8, a check valve 9, a pressure vessel 10, an agitator 11, a heating device 12, a second pressure gauge 13, a second safety valve 14, and a wet gas flow meter 15. Also, the present manufacturing apparatus 100 may further include a back pressure valve 21, a first valve 22, a second valve 23, a third valve 24, and so forth. The first valve 22 to the third valve 24 can each open/close a channel independently. The present manufacturing method can be carried out by the present manufacturing apparatus 100.

(a) Preparation of Polymer Solution

The present manufacturing method includes preparing a polymer solution by mixing an olefin-based resin and a solvent in the pressure vessel 10.

An olefin-based resin is prepared. For example, PE, PP, or the like, may be prepared. The solvent may be, for example, a good solvent for the olefin-based resin. The solvent may contain, for example, n-pentane or the like.

The olefin-based resin and the solvent are charged into the pressure vessel 10. The pressure vessel 10 is sealed. A polymer solution can be formed by mixing the olefin-based resin and the solvent in the pressure vessel 10. For example, the agitator 11 may mix the olefin-based resin and the solvent by agitation of the olefin-based resin and the solvent.

In general, olefin-based resins tend to be difficult to dissolve in solvents. In order to promote formation of the solution, the olefin-based resin and the solvent may be mixed in a high temperature environment, for example. For example, the olefin-based resin and the solvent may be mixed in a high-temperature and high-pressure environment. For example, the heating device 12 may heat the pressure vessel 10. The heating temperature may be the melting point of the olefin-based resin ±20° C., for example. The heating temperature may be 90° C. to 160° C., for example.

The polymer solution may be formed by dissolving olefin-based resin in a solvent, for example. The polymer solution may be formed by mixing an olefin-based resin melt in a solvent, for example.

The mixture ratio (ratio of mass of solvent to mass of olefin-based resin) may be 50 to 150, or may be 50 to 100, or may be 100 to 150, for example.

(b) Formation of High-Pressure Fluid

The present manufacturing method includes formation of a high-pressure fluid of $CO_2$. The gas cylinder 1 filled with $CO_2$ (gas), for example, is prepared. The gas cylinder 1 supplies the $CO_2$. The $CO_2$ is supplied to the compression device 5 via the drying tube 2 and the cooling device 3. The compression device 5 compresses the $CO_2$ to the critical pressure or higher. Thus, a high-pressure fluid is formed.

(c) Temperature Adjustment

The present manufacturing method includes adjusting the temperature of the high-pressure fluid. In the present manufacturing method, the pore structure of the porous medium can be controlled by the temperature of the high-pressure fluid ($CO_2$).

For example, the temperature adjustment device 8 may adjust the temperature of the high-pressure fluid. The temperature adjustment device 8 may heat or may cool the high-pressure fluid. The temperature adjustment device 8 may include, for example, a preheating tube, a cooling tube, and so forth. The temperature adjustment device 8 may include, for example, a pressure vessel, an agitator, a heating device, and so forth. For example, the high-pressure fluid may be heated while the high-pressure fluid is being agitated in the pressure vessel.

For example, the high-pressure fluid may be heated such that the temperature of the high-pressure fluid becomes the room temperature or higher. For example, the high-pressure fluid may be heated such that the temperature of the high-pressure fluid exceeds 20° C. For example, the high-pressure fluid may be heated such that the temperature of the high-pressure fluid is 30° C. or higher. For example, the high-pressure fluid may be heated such that the temperature of the high-pressure fluid is 40° C. or higher. For example, the high-pressure fluid may be heated such that the temperature of the high-pressure fluid is 50° C. or higher.

For example, the high-pressure fluid may be heated such that the temperature of the high-pressure fluid is the critical temperature (31° C.) or higher. A supercritical fluid can be formed when the high-pressure fluid reaches the critical temperature or higher.

(d) Formation of Mixed Fluid

The present manufacturing method includes preparing a mixed fluid by mixing the temperature-adjusted high-pressure fluid and the polymer solution in the pressure vessel 10.

Introducing the high-pressure fluid into the pressure vessel 10 pressurizes inside of the pressure vessel 10. The pressure in the pressure vessel 10 is adjusted to 7.38 MPa (the critical pressure of $CO_2$) or higher. The pressure in the pressure vessel 10 may be adjusted to, for example, 10 MPa to 20 MPa.

The mixed fluid is produced by mixing the high-pressure fluid and the polymer solution in the pressure vessel 10. For example, the agitator 11 may agitate the mixed fluid. In the mixed fluid, the high-pressure fluid ($CO_2$) is a poor solvent.

(e) Phase Separation

The present manufacturing method includes cooling the mixed fluid to cause phase separation of the mixed fluid. For example, the pressure vessel 10 may be cooled by a water-cooled chiller (omitted from illustration). The temperature of the pressure vessel 10 is cooled to, for example, 15° C. to 25° C. After the temperature of the pressure vessel 10 reaches 15° C. to 25° C., the temperature of 15° C. to 25° C. is maintained for 20 to 40 minutes, for example. As a result, the phase separation of the mixed fluid progresses.

(f) Release of Pressure

The present manufacturing method includes vaporization of the solvent and the $CO_2$ by releasing the pressure in the pressure vessel 10 following phase separation. The heating device 12 may heat the pressure vessel 10 to 40° C. to 60° C., for example, prior to releasing the pressure. Heating the pressure vessel 10 prior to release of pressure can reduce formation of dry ice. Formation of dry ice may damage the pore structure.

Following heating the pressure vessel 10, the inside of the pressure vessel 10 is gradually depressurized. The depressurization time may be 10 to 30 minutes, for example. In the process of depressurization, vaporization of the solvent and the $CO_2$ forms a porous medium. The porous medium can be recovered after the inside of the pressure vessel 10 reaches an equilibrium state. For example, the porous medium may be recovered after the inside of the pressure vessel 10 reaches atmospheric pressure and room temperature (10° C. to 30° C.).

Thus, a porous medium is manufactured. The porous medium can have any form. The porous medium may be membranous, block-like, or spherical, for example. When the porous medium is membranous, the porous medium may have a thickness of 1 μm to 10 mm, for example. The thickness of the porous medium can be adjusted, for example, by the amount of the olefin-based resin charged, the amount of the solvent charged, the area of the bottom face within the pressure vessel 10, and so forth.

Control of Pore Structure

According to the present manufacturing method, pore structures of the porous medium can be controlled.

Figure 3:
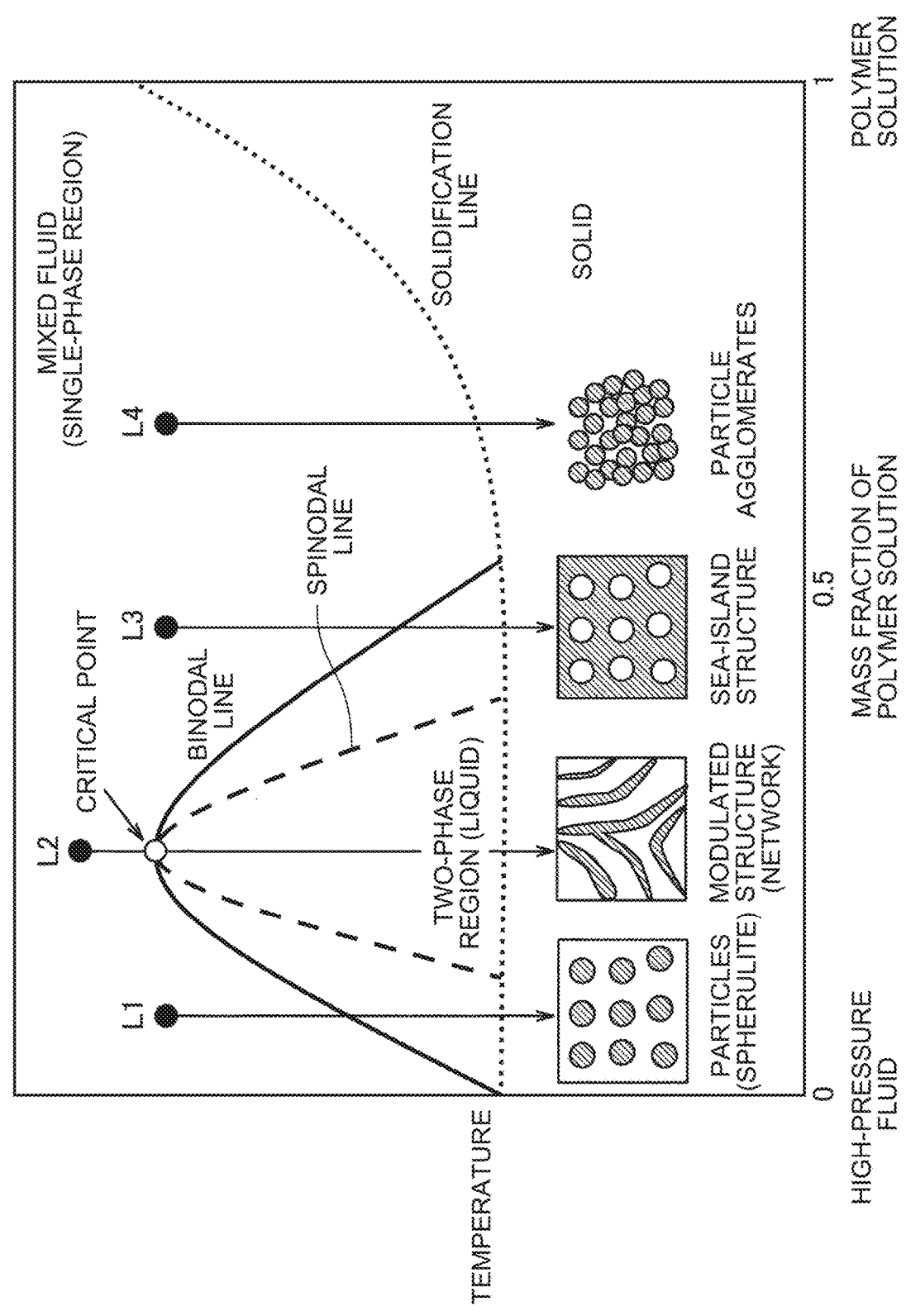
FIG. 3 is a phase diagram of a polymer solution—high-pressure fluid system.
Figure 4:
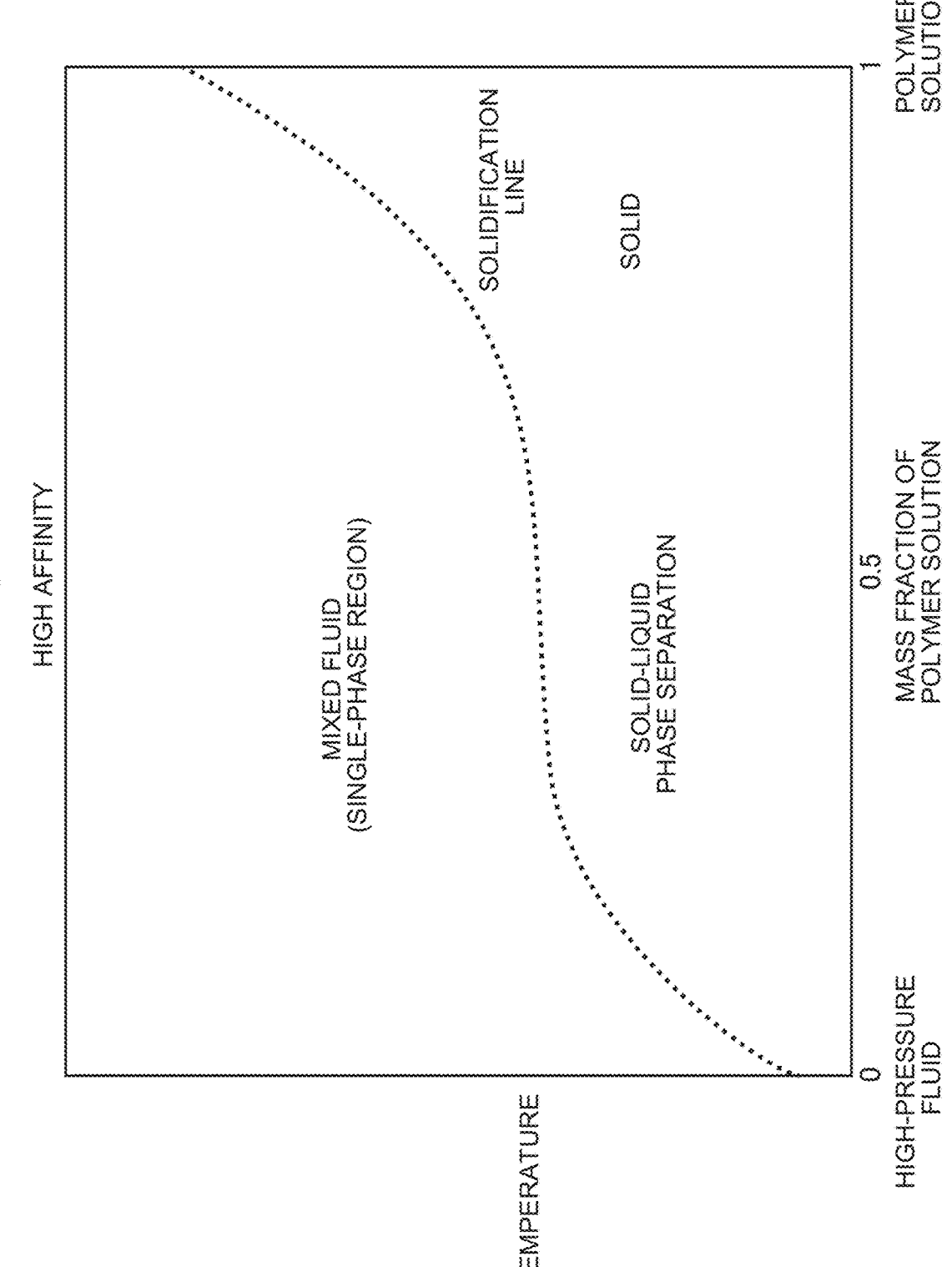
FIG. 4 is a phase diagram showing when a polymer solution and high-pressure fluid have high affinity.
Figure 5:
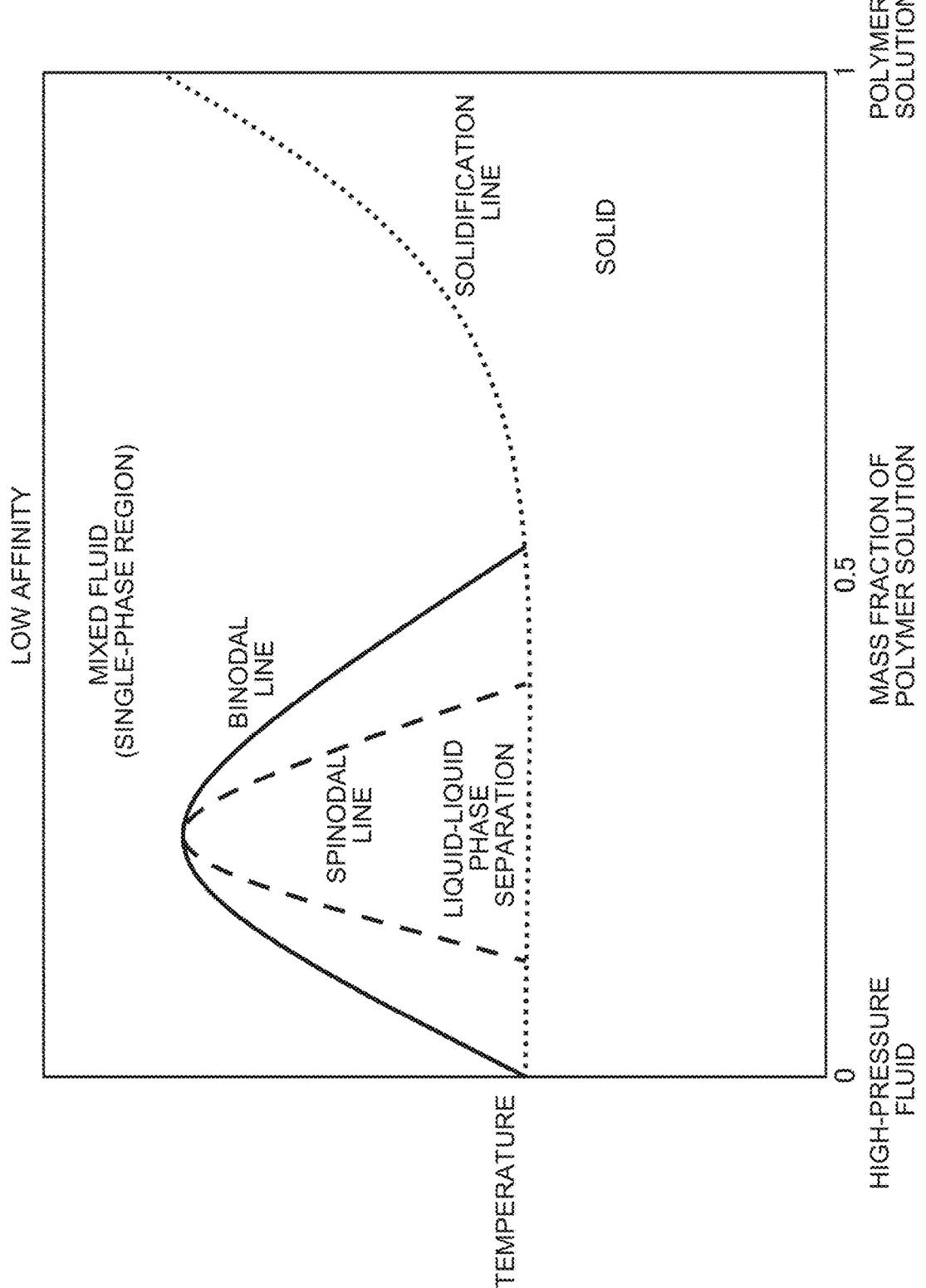
FIG. 5 is a phase diagram showing when a polymer solution and high-pressure fluid have low affinity.

FIG. 3 is a phase diagram of a polymer solution—high-pressure fluid system. In FIGS. 3 to 5, the term "mass fraction of polymer solution" indicates the mass fraction of the polymer solution with respect to the total mass of the polymer solution and the high-pressure fluid. For example, when the mass fraction of the polymer solution is 1, the system is a single phase of the polymer solution. Also, for example, when the mass fraction of the polymer solution is 0 (zero), the system is a single phase of the high-pressure fluid.

In FIG. 3, a solid is formed by cooling the mixed fluid (single-phase region). Pore structures can be controlled by various types of phase separation occurring during the solid formation process.

For example, the mixed fluid is cooled along a first line L1. The mixed fluid solidifies via a region between a binodal line and a spinodal line. Nucleation-growth decomposition is thought to occur in this region. On the first line L1, the mass fraction of the polymer solution is low. That is to say, the amount of high-pressure fluid (poor solvent) is relatively great. Spherulite structures are formed through prioritization of nucleation of the polymer. This forms a first pore structure. The first pore structure is formed by particles being linked.

For example, the mixed fluid is cooled along a second line L2. The mixed fluid solidifies via a region (spinodal region) surrounded by the spinodal line and a solidification line (crystallization temperature). Spinodal decomposition (liquid-liquid phase separation) is thought to occur in the spinodal region. Modulated structures can be formed by spinodal decomposition. This forms a second pore structure. The second pore structure is a three-dimensional network. In the second pore structure, multiple foamy pores communicate with each other. The second pore structure is thought to be suitable for a separator for a battery, for example.

For example, the mixed fluid is cooled along a third line L3. The mixed fluid solidifies via a region between the binodal line and the spinodal line. Nucleation-growth decomposition is thought to occur in this region. On the third line L3, the mass fraction of the polymer solution is high. That is to say, the amount of polymer is relatively great. A sea-island structure is formed through prioritization of nucleation of the poor solvent. This forms a third pore structure. The third pore structure is a three-dimensional network. In the third pore structure, multiple foamy pores are independent from each other. The third pore structure can resemble the pore structure of a foamed material.

For example, the mixed fluid is cooled along a fourth line L4. The mixed fluid does not intersect the binodal line, and solidifies. On the fourth line L4, the mass fraction of the polymer solution is the highest. Here, particle agglomerates can be formed.

The particle agglomerates can have a cauliflower-like appearance, for example.

For example, the second pore structure can be selectively formed in the spinodal region by adjusting the mixture ratio of the polymer solution and the high-pressure fluid.

The phase diagram of the mixed system can be controlled by the temperature of the high-pressure fluid ($CO_2$). Affinity between the high-pressure fluid and the polymer solution is thought to change depending on the temperature of the high-pressure fluid. The affinity can be assessed by a solubility parameter, for example.

For example, a solubility parameter ($\delta_0$) of n-pentane (solvent) can be 14.2 (MPa)". For example, a first solubility parameter ($\delta_1$) of PE (olefin-based resin) can be 16.3 (MPa) ". The affinity between the olefin-based resin and the solvent is thought to be high in the polymer solution.

For example, $CO_2$ at 20° C. and 15 MPa is used as the high-pressure fluid. A second solubility parameter ($\delta_2$) of $CO_2$ (20° C., 15 MPa) can be 14.2 $(MPa)^{0.5}$. The difference between the first solubility parameter ($\delta_1$) and the second solubility parameter ($\delta_2$) is small, and accordingly the affinity between the polymer solution and the high-pressure fluid ($CO_2$) is thought to be relatively high in the mixed fluid.

FIG. 4 is a phase diagram showing when a polymer solution and a high-pressure fluid have high affinity. When the affinity between the polymer solution and the high-pressure fluid is high, the binodal line and the spinodal line are located on the lower temperature side of the solidification line. Accordingly, liquid-liquid phase separation does not occur, and solid-liquid phase separation occurs. The first pore structure (spherulite structure) is thought to be formed by the solid-liquid phase separation.

For example, $CO_2$ at 100° C. and 15 MPa is used as the high-pressure fluid. The second solubility parameter ($\delta_2$) of $CO_2$ (100° C., 15 MPa) can be 5.3 $(MPa)^{0.5}$. The difference between the first solubility parameter ($\delta_0$ and the second solubility parameter ($\delta_2$) is great, and accordingly the affinity between the polymer solution and the high-pressure fluid ($CO_2$) is thought to be relatively low.

FIG. 5 is a phase diagram showing when a polymer solution and a high-pressure fluid have low affinity. Reduction in the affinity between the polymer solution and the high-pressure fluid results in the binodal line and the spinodal line appearing in the liquid phase. That is to say, a spinodal region is formed. A second pore structure (modulated structure) is thought to be formed by the liquid-liquid phase separation occurring in the spinodal region. That is to say, a spinodal region can be formed in the liquid phase by adjusting the temperature of the high-pressure fluid. By adjusting the temperature of the high-pressure fluid, the phase separation can exhibit spinodal decomposition.

Note that the reason why the solubility parameter falls due to the temperature rise of the high-pressure fluid ($CO_2$) is thought to be that the density decreases due to the rise in temperature. For example, $CO_2$ (20° C., 15 MPa) can have a density of 903 kg/m$^3$. For example, $CO_2$ (100° C., 15 MPa) can have a density of 332 kg/m$^3$. Manufacturing Method of Separator for Battery The porous media can be used for any purpose. The porous media may be used as a separator for a battery (hereinafter may be abbreviated to "separator"), for example.

Figure 6:
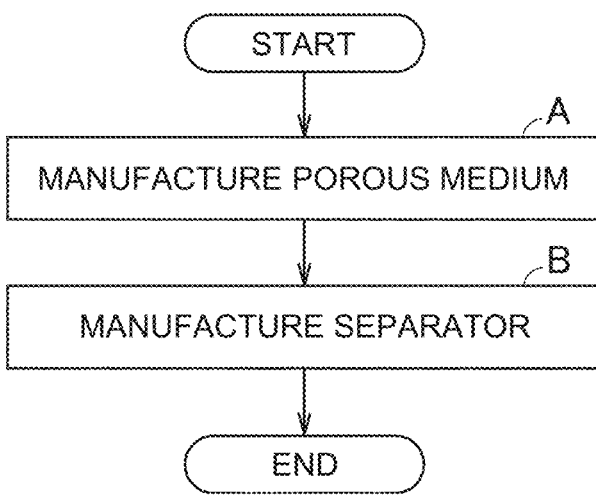
FIG. 6 is a schematic flowchart showing a manufacturing method of a separator for a battery according to the embodiment.

FIG. 6 is a schematic flowchart showing a manufacturing method of a separator for a battery according to the present embodiment. The manufacturing method of the separator includes "(A) manufacturing of a porous medium" and "(B) manufacturing of a separator".

(A) Manufacturing of Porous Medium

The manufacturing method of the separator includes manufacturing the porous medium by the present manufacturing method. The details of this manufacturing method are as described above.

(B) Manufacturing Separator

The manufacturing method of the separator includes manufacturing the separator including the porous medium. The separator is an electrically-insulating porous membrane. For example, the separator may be manufactured by subjecting the porous medium to various processes, such as cutting, stretching, and compressing, and so forth. For example, when the porous medium is membranous, a separator having a multi-layer structure may be manufactured by laminating a plurality of sheets of porous media. For example, a separator may be manufactured by coating the surface of the porous medium with a ceramic material. The separator may have a thickness of 1 μm to 100 or may have a thickness of 10 μm to 50 for example.

The separator may be for a lithium-ion battery, for example. The porous medium may have the second pore structure (three-dimensional network, communicating pores), for example. Reduction in battery resistance can be anticipated, for example, due to the porous medium having the second pore structure.

The porous medium may contain PE, for example. Including PE in the porous medium can impart a shutdown function, for example, to the separator. The shutdown function is a function in which ionic conduction is blocked by the pores closing, when the battery temperature rises. The porous medium may contain PP, for example. Including PP in the porous medium can impart mechanical strength, electrochemical stability, and so forth, to the separator.

Materials Used

In the present example, the following materials were used.

Low-density polyethylene: Petrosen (registered trademark), manufactured by Tosoh Corporation Grade 353

Melt mass flow rate 145 g/10 min

Density 915 kg/m$^3$

Melting temperature 98° C.

Homopolypropylene: Prime Polypro (registered trademark), manufactured by Prime Polymer Co., Ltd.

Grade J137G

Melt mass flow rate 30 g/10 min

Density 915 kg/m$^3$ n-pentane: CAS No. 109-66-0

Manufacturing of Porous Medium of Olefin-Based Resin

Porous media according to Nos. 1 to 12 were manufactured as described below.

No. 1

The present manufacturing apparatus 100 illustrated in FIG. 2 was prepared. 0.06 g of PE (olefin-based resin) and 3.0 g of n-pentane (solvent) were sealed in the pressure vessel 10. The heating device 12 heated the pressure vessel 10 to 95° C.

The gas cylinder 1 supplied $CO_2$ (gas). A high-pressure fluid was formed by the compression device 5 compressing the $CO_2$. The temperature adjustment device 8 adjusted the temperature of the high-pressure fluid to 20° C.

The temperature-adjusted high-pressure fluid was introduced into the pressure vessel 10. The high-pressure fluid was supplied such that the pressure in the pressure vessel 10 reached 15 MPa.

A water-cooled chiller cooled the pressure vessel 10 to 20° C. After reaching 20° C., the temperature was maintained around 20° C. for 30 minutes.

The heating device 12 heated the pressure vessel 10 to 50° C. After heating, the pressure vessel 10 was gradually depressurized. The depressurization time was 20 minutes.

When the inside of the pressure vessel 10 reached atmospheric pressure and room temperature, the porous medium was recovered. Thus, the porous medium was manufactured.

Nos. 2 to 4

As shown in Table 1 below, porous media were manufactured in the same manner as with No. 1, except that the temperature of the high-pressure fluid was changed.

Nos. 5 to 8

As shown in Table 1 below, porous media were manufactured in the same manner as with No. 1, except that the amount of materials charged, and the temperature of the high-pressure fluid, were changed.

Nos. 9 to 12

As shown in Table 1 below, porous media were manufactured in the same manner as with No. 1, except that the type of olefin-based resin, the amount of materials charged, and the temperature of the high-pressure fluid, were changed.

TABLE 1

| | | Olefin-based resin | | | Solvent | | | High-pressure fluid ($CO_2$) | | | Pressure vessel | | Porous medium |
| | | Amount | | | Amount | | | | | | | | |
| No | Type | charged (g) | $\delta_1$ ((MPa)$^{0.5}$) | Type | charged (g) | $\delta_0$ ((MPa)$^{0.5}$) | Temperature (° C.) | $\delta_2$ ((MPa)$^{0.5}$) | $\delta_1 - \delta_2$ ((MPa)$^{0.5}$) | Temperature (° C.) | Pressure (MPa) | Pore structure [1] |
|---|---|---|---|---|---|---|---|---|---|---|---|---|
| 1 | PE | 0.06 | 16.3 | n-pentane | 3.0 | 14.4 | 20 | 14.2 | 2.1 | 95 | 15 | I |
| 2 | PE | 0.06 | 16.3 | n-pentane | 3.0 | 14.4 | 50 | 11.0 | 5.3 | 95 | 15 | II |
| 3 | PE | 0.06 | 16.3 | n-pentane | 3.0 | 14.4 | 75 | 7.6 | 8.7 | 95 | 15 | II |
| 4 | PE | 0.06 | 16.3 | n-pentane | 3.0 | 14.4 | 100 | 5.3 | 11 | 95 | 15 | III |

TABLE 1-continued

Table 1

| | | Olefin-based resin | | | Solvent | | High-pressure fluid ($CO_2$) | | | Pressure vessel | | Porous medium |
| | | Amount | | | Amount | | | | | | | |
| No | Type | charged (g) | $\delta_1$ $((MPa)^{0.5})$ | Type | charged (g) | $\delta_0$ $((MPa)^{0.5})$ | Temperature (° C.) | $\delta_2$ $((MPa)^{0.5})$ | $\delta_1 - \delta_2$ $((MPa)^{0.5})$ | Temperature (° C.) | Pressure (MPa) | Pore structure [1] |
|---|---|---|---|---|---|---|---|---|---|---|---|---|
| 5 | PE | 0.03 | 16.3 | n-pentane | 4.5 | 14.4 | 60 | 9.5 | 6.8 | 95 | 15 | I, II |
| 6 | PE | 0.03 | 16.3 | n-pentane | 4.5 | 14.4 | 65 | 8.8 | 7.5 | 95 | 15 | II |
| 7 | PE | 0.03 | 16.3 | n-pentane | 4.5 | 14.4 | 70 | 8.2 | 8.1 | 95 | 15 | II |
| 8 | PE | 0.03 | 16.3 | n-pentane | 4.5 | 14.4 | 75 | 7.6 | 8.7 | 95 | 15 | II |
| 9 | PP | 0.2 | 18.1 | n-pentane | 20 | 14.4 | 120 | 4.2 | 13.9 | 150 | 15 | III |
| 10 | PP | 0.03 | 18.1 | n-pentane | 4.5 | 14.4 | 130 | 4.1 | 14 | 150 | 15 | II |
| 11 | PP | 0.03 | 18.1 | n-pentane | 4.5 | 14.4 | 140 | 4.0 | 14.1 | 150 | 15 | II |
| 12 | PP | 0.03 | 18.1 | n-pentane | 4.5 | 14.4 | 150 | 3.8 | 14.3 | 150 | 15 | II |

[1] Pore structure

I: First pore structure (spherulite structure)

II: Second pore structure (three-dimensional network structure, communicating pores)

III: Third pore structure (three-dimensional network structure, independent pores)

Results

Figure 7:
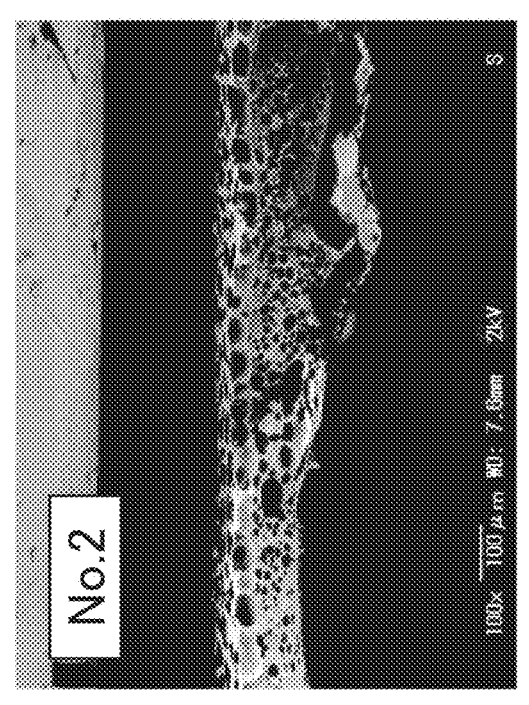
FIG. 7 shows electron microscope images of porous media Nos. 1 to 4.
Figure 7:
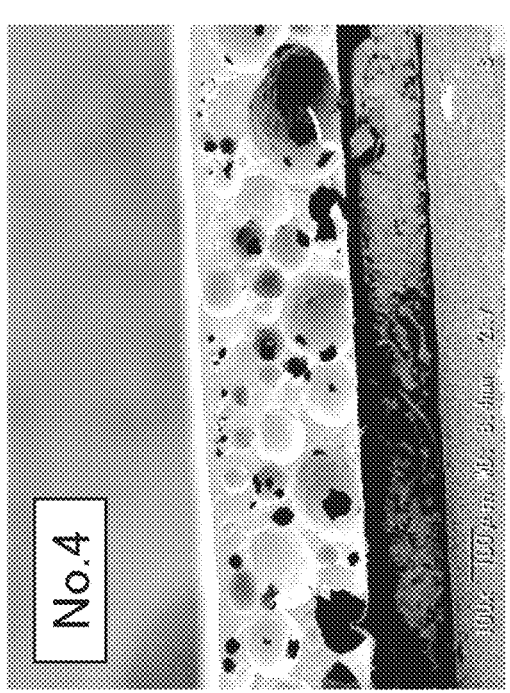
Figure 7:
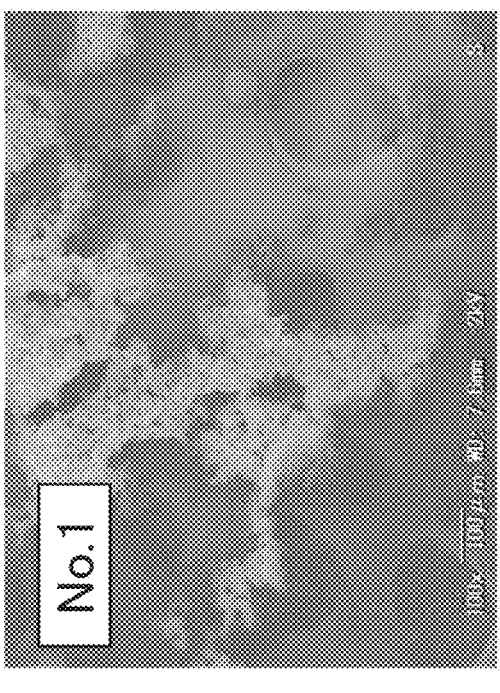
Figure 7:
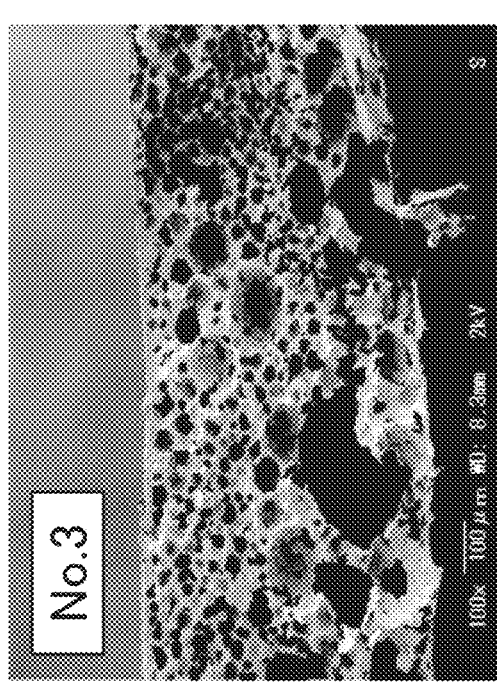

FIG. 7 shows electron microscope images of porous media Nos. 1 to 4. In Nos. 1 to 4, a tendency was observed in which the pore structure changes as the temperature of the high-pressure fluid ($CO_2$) rises (see Table 1 above).

The porous medium of No. 1 has the first pore structure (see FIG. 7). The first pore structure (spherulite structure) is formed by particles linking.

The porous media of Nos. 2 and 3 have the second pore structure (see FIG. 7). The second pore structure is a three-dimensional network. In the second pore structure, multiple foamy pores communicate with each other. That is to say, the second pore structure includes communicating pores. Variance in the size of the foamy pores is a characteristic thereof.

The porous medium of No. 4 has the third pore structure (see FIG. 7). The third pore structure is a three-dimensional network. In the third pore structure, multiple foamy pores are independent from each other. That is to say, the third pore structure includes independent pores.

A 1.1 kg stainless steel (SS) plate was placed on each of the porous media of Nos. 1 to 4. After 20 seconds, the state of each porous medium was visually confirmed. No. 1 (spherulite) could not maintain the membrane shape and became disassembled. The bonds between the particles are thought to be weak, and hence the manufactured article was brittle. No. 2 to No. 4 (network) maintained the membrane form.

Figure 8:
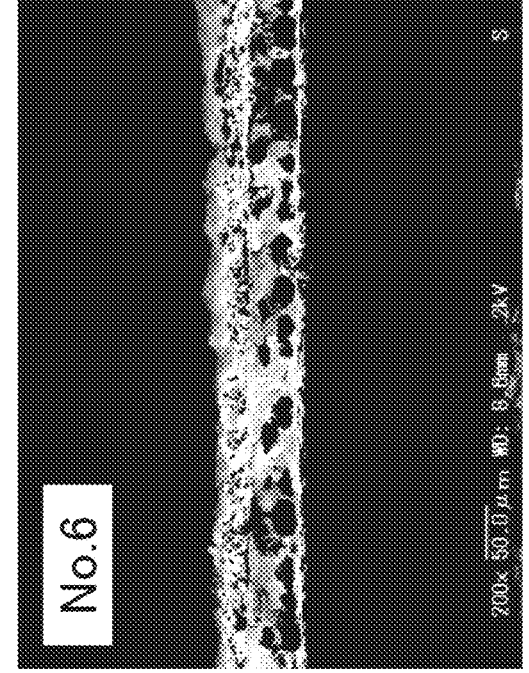
FIG. 8 shows electron microscope images of porous media Nos. 5 to 8.
Figure 8:
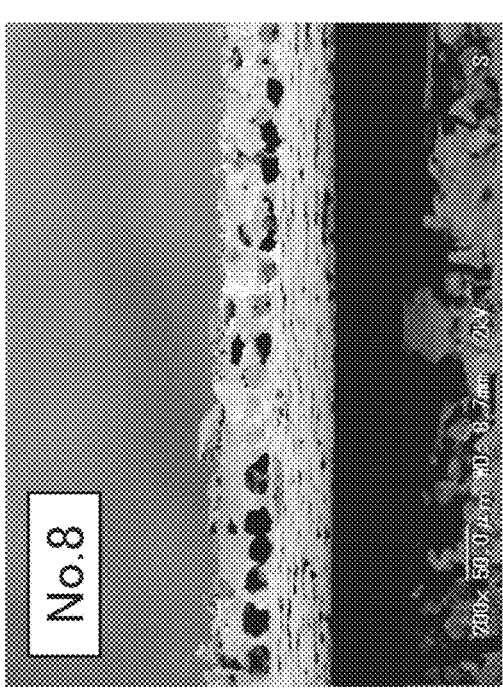
Figure 8:
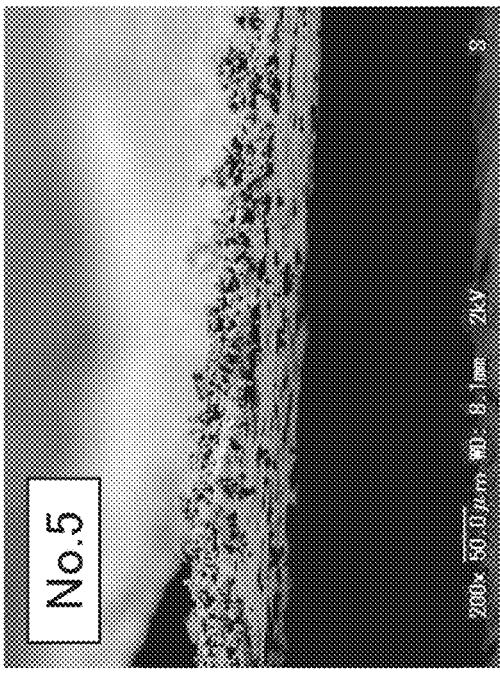
Figure 8:
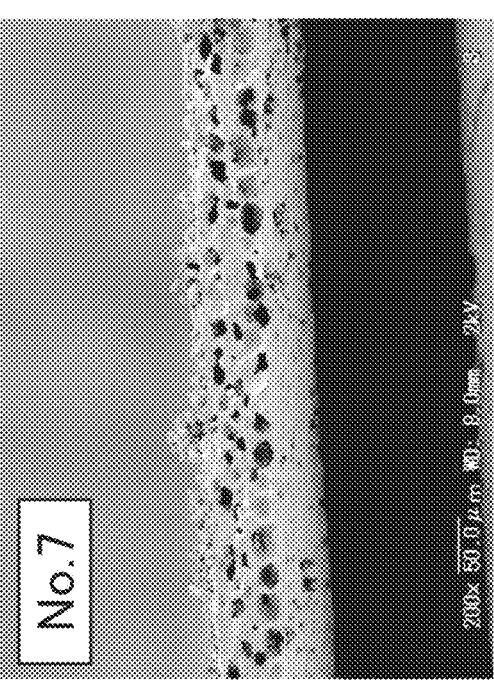

FIG. 8 shows electron microscope images of porous media Nos. 5 to 8. In the No. 5 porous medium, characteristics of both the first pore structure and the second pore structure are observed (see FIG. 8).

When the difference ($\delta_1 - \delta_2$) between the first solubility parameter ($\delta_1$) of the olefin-based resin and the second solubility parameter ($\delta_2$) of the high-pressure fluid is 5.3 $(MPa)^{0.5}$ or more, there is a tendency for the second pore structure and the third pore structure to be readily formed (see Table 1 above).

When the olefin-based resin is PE, the difference in solubility parameters ($\delta_1 - \delta_2$) may be, for example, 6.8 $(MPa)^{0.5}$ or more. The difference in solubility parameters ($\delta_1 - \delta_2$) may be, for example, 11 $(MPa)^{0.5}$ or less, or may be 8.7 $(MPa)^{0.5}$ or less.

When the olefin-based resin is PE, the temperature of the high-pressure fluid is adjusted to 50° C. to 100° C., whereby the second pore structure and the third pore structure tend to be readily formed (see Table 1 above).

When the olefin-based resin is PE, the temperature of the high-pressure fluid may be, for example, 60° C. or higher, or may be 65° C. or higher. When the olefin-based resin is PE, the temperature of the high-pressure fluid may be, for example, 75° C. or lower, or may be 70° C. or lower. Due to the temperature of the high-pressure fluid being 75° C. or lower, the second pore structure tends to be readily formed (see Table 1 above).

Figure 9:
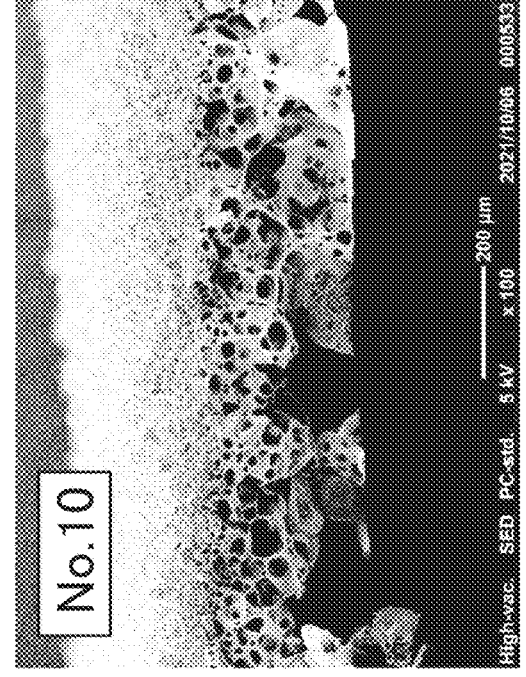
FIG. 9 shows electron microscope images of porous media Nos. 9 to 12.
Figure 9:
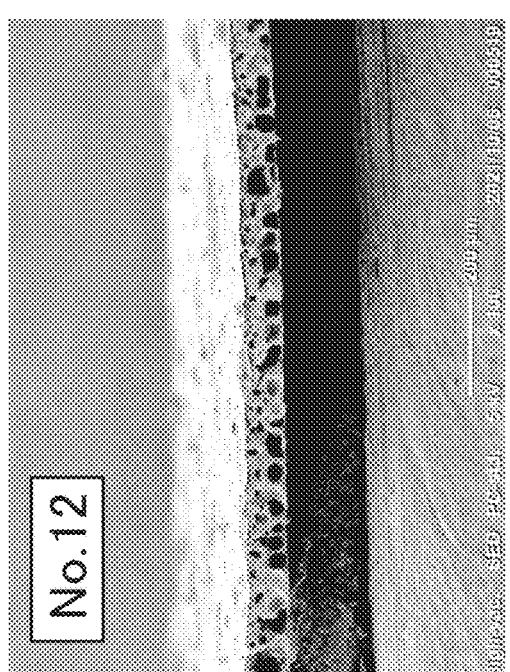
Figure 9:
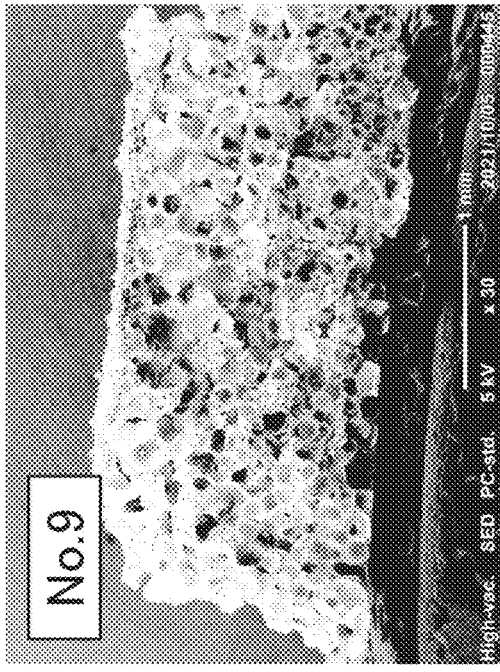
Figure 9:
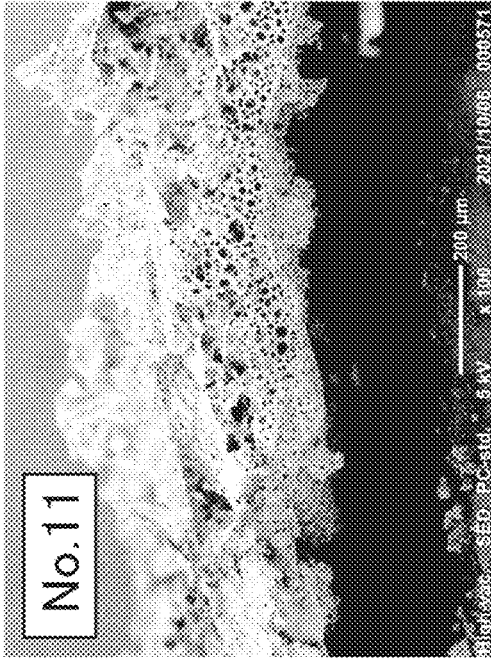

FIG. 9 shows electron microscope images of porous media Nos. 9 to 12. When the olefin-based resin is PP, the temperature of the high-pressure fluid is adjusted to 120° C. to 150° C., whereby the second pore structure and the third pore structure tend to be readily formed (see Table 1 above).

When the olefin-based resin is PP, the temperature of the high-pressure fluid may be, for example, 130° C. or higher, or may be 140° C. or higher. Due to the temperature of the high-pressure fluid being 130° C. or higher, the second pore structure tends to be readily formed (see Table 1 above). When the olefin-based resin is PP, the temperature of the high-pressure fluid may be, for example, 150° C. or lower.

When the olefin-based resin is PP, the difference in solubility parameters ($\delta_1 - \delta_2$) may be, for example, 13.9 to 14.3 $(MPa)^{0.5}$.

The present embodiment and the present example are illustrative in all respects. The present embodiment and the present example are not restrictive. The technical scope of the present disclosure includes all modifications within the meaning and scope equivalent to the claims. For example, extracting optional configurations from the present embodiment and the present example and making optional combinations thereof is originally planned.

What is claimed is:

1. A manufacturing method of a porous medium of an olefin-based resin, the manufacturing method comprising steps of:

(a) preparing a polymer solution by mixing the olefin-based resin and a solvent in a pressure vessel;

(b) creating a high-pressure fluid of carbon dioxide;

(c) adjusting a temperature of the high-pressure fluid;

(d) preparing a mixed fluid by mixing the high-pressure fluid of which the temperature is adjusted, and the polymer solution, in the pressure vessel;

(e) cooling the mixed fluid to cause phase separation of the mixed fluid; and (f) vaporizing the solvent and the carbon dioxide following the phase separation, by releasing pressure in the pressure vessel, wherein the vaporizing of the solvent and the carbon dioxide in the step (f) produces the porous medium of the olefin-based resin.

2. The manufacturing method according to claim 1, wherein:

the porous medium of the olefin-based resin contains at least one type selected from a group consisting of a first pore structure, a second pore structure, and a third pore structure;

the first pore structure is made by particles being linked, the second pore structure is a three-dimensional network, and in the second pore structure, multiple foamy pores communicate with each other, and the third pore structure is a three-dimensional network, and in the third pore structure, the multiple foamy pores are independent from each other.

3. The manufacturing method according to claim 1, wherein the step (c) includes adjusting the temperature of the high-pressure fluid such that the phase separation results in spinodal decomposition.

4. The manufacturing method according to claim 3, wherein the step (c) includes adjusting the temperature of the high-pressure fluid such that a spinodal region is created in a liquid phase in a phase diagram of the polymer solution and the high-pressure fluid.

5. The manufacturing method according to claim 4, wherein in the spinodal region, a mixture ratio of the polymer solution and the high-pressure fluid is adjusted.

6. The manufacturing method according to claim 1, wherein the step (c) includes adjusting the temperature of the high-pressure fluid such that a difference between a first solubility parameter of the olefin-based resin and a second solubility parameter of the high-pressure fluid is 5.3 or more.

7. The manufacturing method according to claim 1, wherein:

the olefin-based resin contains polyethylene; and in the step (c), the temperature of the high-pressure fluid is adjusted to 50° C. to 100° C.

8. The manufacturing method according to claim 1, wherein:

the olefin-based resin contains polypropylene; and in the step (c), the temperature of the high-pressure fluid is adjusted to 120° C. to 150° C.

9. The manufacturing method according to claim 1, wherein the high-pressure fluid is a supercritical fluid.

10. The manufacturing method according to claim 1, wherein in the step (f), the pressure vessel is heated to 40° C. to 60° C. before the pressure is released.

11. A manufacturing method of a separator for a battery, the manufacturing method comprising:

(A) manufacturing a porous medium of an olefin-based resin by the manufacturing method according to claim 1; and (B) manufacturing a separator for a battery, the separator including the porous medium of the olefin-based resin.

* * * * *